(12) United States Patent
Watanabe et al.

(10) Patent No.: US 7,630,940 B2
(45) Date of Patent: Dec. 8, 2009

(54) CONTENT SHARING SYSTEM AND METHOD

(75) Inventors: Keiko Watanabe, Fuchu (JP); Jun Sato, Kawasaki (JP); Toru Terauchi, Tokyo (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 204 days.

(21) Appl. No.: 11/606,807

(22) Filed: Nov. 30, 2006

(65) Prior Publication Data

US 2008/0082445 A1    Apr. 3, 2008

(30) Foreign Application Priority Data

Sep. 8, 2006    (JP)    ............... 2006-244485

(51) Int. Cl.
*H04L 9/00*    (2006.01)
(52) U.S. Cl. ............... 705/52; 713/170; 713/156; 713/176
(58) Field of Classification Search ........... 705/60, 705/32
See application file for complete search history.

(56) References Cited

U.S. PATENT DOCUMENTS

| | | | |
|---|---|---|---|
| 6,973,445 B2 * | 12/2005 | Tadayon et al. | ............... 705/64 |
| 2003/0233549 A1 * | 12/2003 | Hatakeyama et al. | ....... 713/170 |
| 2004/0073513 A1 * | 4/2004 | Stefik et al. | ............... 705/52 |
| 2004/0249815 A1 * | 12/2004 | Lee | ............... 707/9 |
| 2005/0004873 A1 * | 1/2005 | Pou et al. | ............... 705/51 |
| 2006/0053079 A1 * | 3/2006 | Edmonson et al. | ............ 705/59 |
| 2006/0053080 A1 * | 3/2006 | Edmonson et al. | ............ 705/59 |
| 2006/0106721 A1 * | 5/2006 | Hori et al. | ............... 705/51 |
| 2006/0168357 A1 * | 7/2006 | Nakano et al. | ............... 710/5 |
| 2007/0100701 A1 * | 5/2007 | Boccon-Gibod et al. | ....... 705/21 |
| 2007/0299681 A1 * | 12/2007 | Plastina et al. | ............... 705/1 |
| 2008/0066181 A1 * | 3/2008 | Haveson et al. | ............... 726/26 |
| 2008/0155634 A1 * | 6/2008 | Khedouri et al. | ............ 725/118 |

FOREIGN PATENT DOCUMENTS

JP    2005-92851 A    4/2005

* cited by examiner

*Primary Examiner*—Evens J Augustin
(74) *Attorney, Agent, or Firm*—Frishauf, Holtz, Goodman & Chick, P.C.

(57) ABSTRACT

According to an aspect of the invention, there is provided a content sharing system including: a first device configured to acquire a right object; a second device configured to acquire a content of the right object from the first device; a session key generation unit provided in the first device and the second device and configured to generate a session key based on mutual authentication; a temporary right object generation unit provided in the first device and configured to generate a temporary right object from the right object by using the session key to supply the generated temporary right to the second device; and a content play unit provided in the second device and configured to receive the temporary right object to play the content of the right object acquired from the first device by using the temporary right object.

6 Claims, 7 Drawing Sheets

CONTENT SHARING SYSTEM AND METHOD

CROSS-REFERENCE TO RELATED APPLICATIONS

This application is based on and claims the benefit of priority from the prior Japanese Patent Application No. 2006-244485, filed on Sep. 8, 2006; the entire contents of which are incorporated herein by reference.

TECHNICAL FIELD

The present invention relates to a content sharing system and method which can play contents without being connected to a right issuing server.

BACKGROUND

Description of Related Art

In OMA DRM v2 (Open Mobile Alliance Digital Rights Management version 2), it is defined that devices perform a process of joining/unjoining to/from a domain through a server in order to share rights.

JP-A-2005-92851 discloses a system in which license information includes identifiers corresponding to two or more devices capable of using contents, and the identifiers are extracted from the license information when receiving contents. In the system, the contents may be played when the extracted identifier matches to that of the corresponding device. Also, in the system disclosed in JP-A-2005-92851, devices share the contents through a server.

SUMMARY

According to an aspect of the invention, there is provided a content sharing system including: a first device configured to acquire a right object; a second device configured to acquire a content of the right object from the first device; a session key generation unit provided in the first device and the second device and configured to generate a session key based on mutual authentication; a temporary right object generation unit provided in the first device and configured to generate a temporary right object from the right object by using the session key to supply the generated temporary right to the second device; and configured to receive the temporary right object to play the content of the right object acquired from the first device by using the temporary right object and a content play unit provided in the second device.

According to another aspect of the invention, there is provided a content sharing method for a content sharing system that includes a first device configured to acquire a right object and a second device configured to acquire a content of the right object from the first device, the content sharing method comprising: performing mutual authentication between the first device and the second device; generating a session key based on the mutual authentication; generating, in the first device, a temporary right object from the right object by using the session key and supplying the generated temporary right object to the second device; receiving, in the second device, the temporary right object and playing a content of the right object acquired from the first device by using the received temporary right object.

DESCRIPTION OF THE EMBODIMENTS

Hereinafter, a content sharing system and method according to embodiments of the present invention will be described with reference to the drawings. In the drawings, the same components will be denoted by the same reference numerals and thus description thereof will be omitted.

Figure 1:
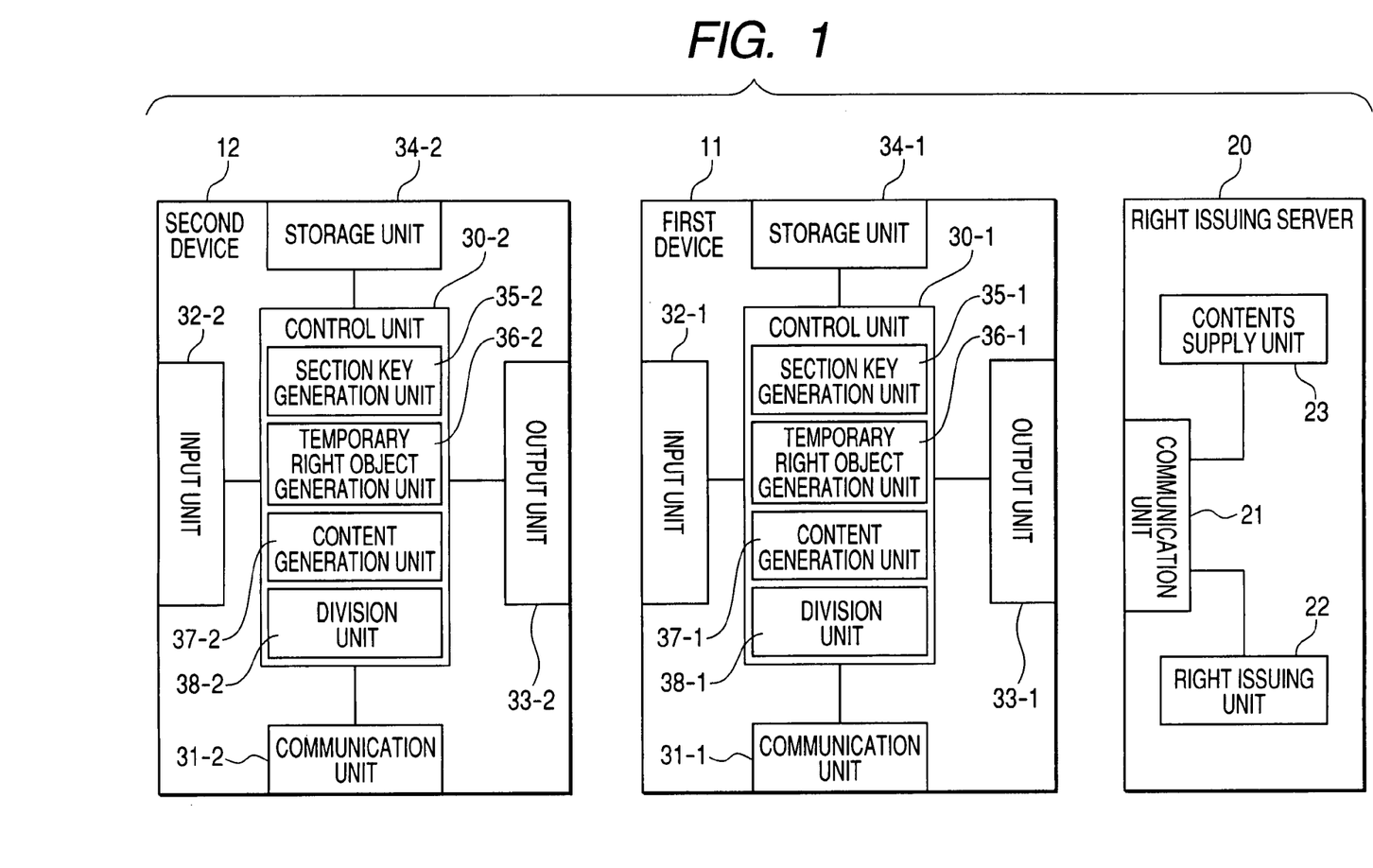
FIG. 1 is an exemplary diagram showing the configuration of a content sharing system according to an embodiment of the invention.

FIG. 1 is a diagram showing the configuration of a content sharing system according to an embodiment of the invention. The content sharing system includes a first device 11 and a second device 12. The first device 11 acquires right objects from a rights issuing server 20. The rights issuing server 20 has the configuration as a server computer. In the rights issuing server 20, a right object RO issued from a right issuing unit 22 and contents E-C, corresponding to the right object RO, encrypted by a contents supply unit 23 are supplied to devices such as the first and second devices through a communication unit 21.

Figure 2:
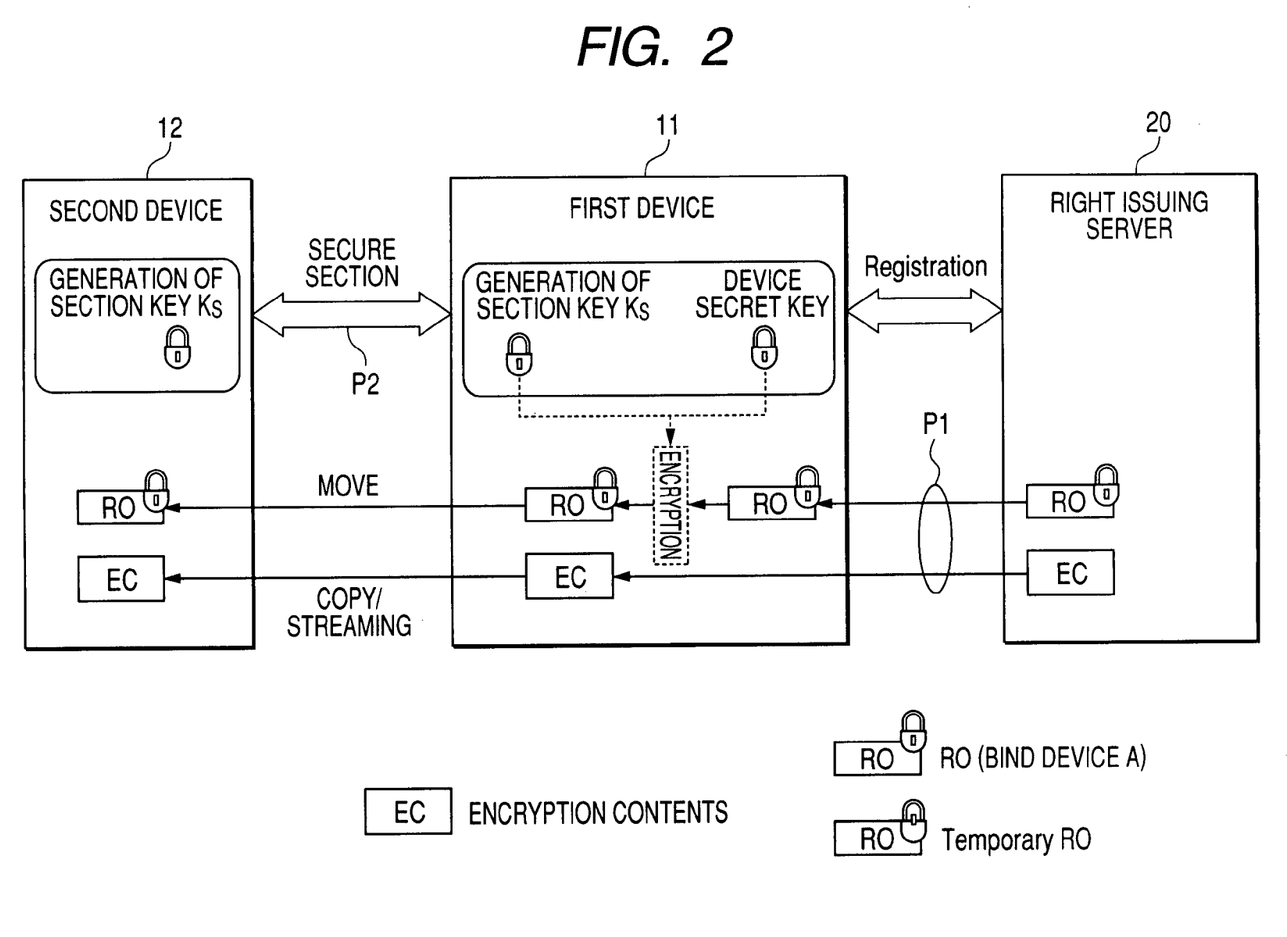
FIG. 2 is an exemplary view showing a process of temporally sharing contents of the content sharing system according to the embodiment.

As indicated by P1 in FIG. 2, it is shown that the rights issuing server 20 provides the right object RO issued by the issuing unit 22 and the encrypted contents E-C corresponding to the right object supplied by the contents supply unit 23 to the first device 11.

The first and second devices 11 and 12 may be a terminal such as a mobile phone and have the same configuration. Meanwhile, the second device 12 serves as a temporary right object receiver. The second device 12 does not serve as a temporary right object generation unit or a division unit. Hereinafter, the first device 11 will be representatively described.

FIG. 1 shows an example of the configuration of the first device that includes a control unit 30-1, a communication unit 31-1, an input unit 32-1 having keys and/or a camera, an output unit 33-1 having a display unit, a speaker and a microphone, and a storage unit 34-1 in which the program and/or acquired contents are stored.

The control unit 30-1 includes a session key generation unit 35-1, a temporary right object generation unit 36-1, a contents play unit 37-1, and a division unit 38-1.

The session key generation unit 35-1 executes mutual authentication process with a desired device and generates a session key. As indicated by P2 in FIG. 2, the session key generation unit 35-1 generates a session key $K_S$ with respect to the first and second devices 11 and 12. The temporary right object generation unit 36-1 generates a temporary right object $RO_S$ from the right object RO using the session key $K_S$ and sends the generated temporary right object $RO_S$ to the desired devices. In FIG. 2, the temporary right object $RO_S$ is sent (moved) from the first device 11 to the second device 12. The contents play unit 37-2 receives the temporary right object $RO_S$ and plays the contents corresponding to the right object acquired from the first device 11 using the temporary right object $RO_S$. In FIG. 2, encrypted contents E-C are supplied from the first device 11 to the second device 12 by being copied or streamed. The contents play unit 37-2 plays the right object contents E-C acquired from the first device 11 using the temporary right object $RO_S$.

The division unit 38-1 divides the contents corresponding to right object and supplies the divided contents to other devices. When the contents corresponding to right object are divided and then supplied, the temporary right object generation unit 36-1 generates and supplies the temporary right object to one or a plurality of divided parts of the contents. At this time, the temporary right object generation unit 36-1 may generate and supply the different temporary right object to one or the plurality of division parts.

Hereinafter, the procedure in which the first device 11 which acquires the right object from the rights issuing server 20 and supplies the temporary right object to the second device 12 so as to share the contents in the content sharing system having the above-described configuration.

Figure 3:
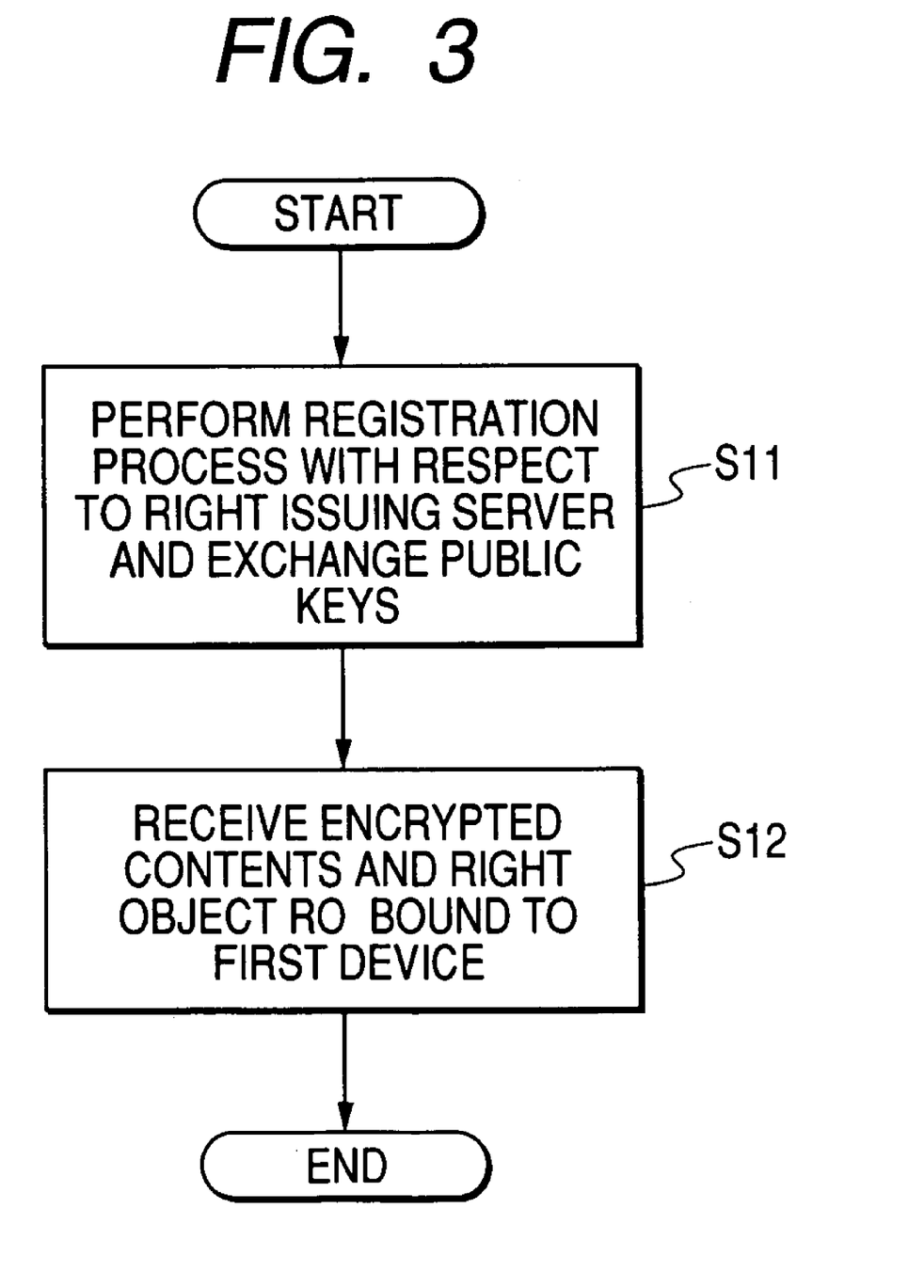
FIG. 3 is an exemplary flow chart showing a process of acquiring a right object of the content sharing system according to the embodiment.

As shown in a flow chart of FIG. 3, the first device 11 performs a registration process with respect to the rights issuing server 20 and exchanges public keys (step S11). The first device 11 receives a right object RO bound to the first device 11 and encrypted contents E-C from the rights issuing server 20 (step S12).

Figure 4:
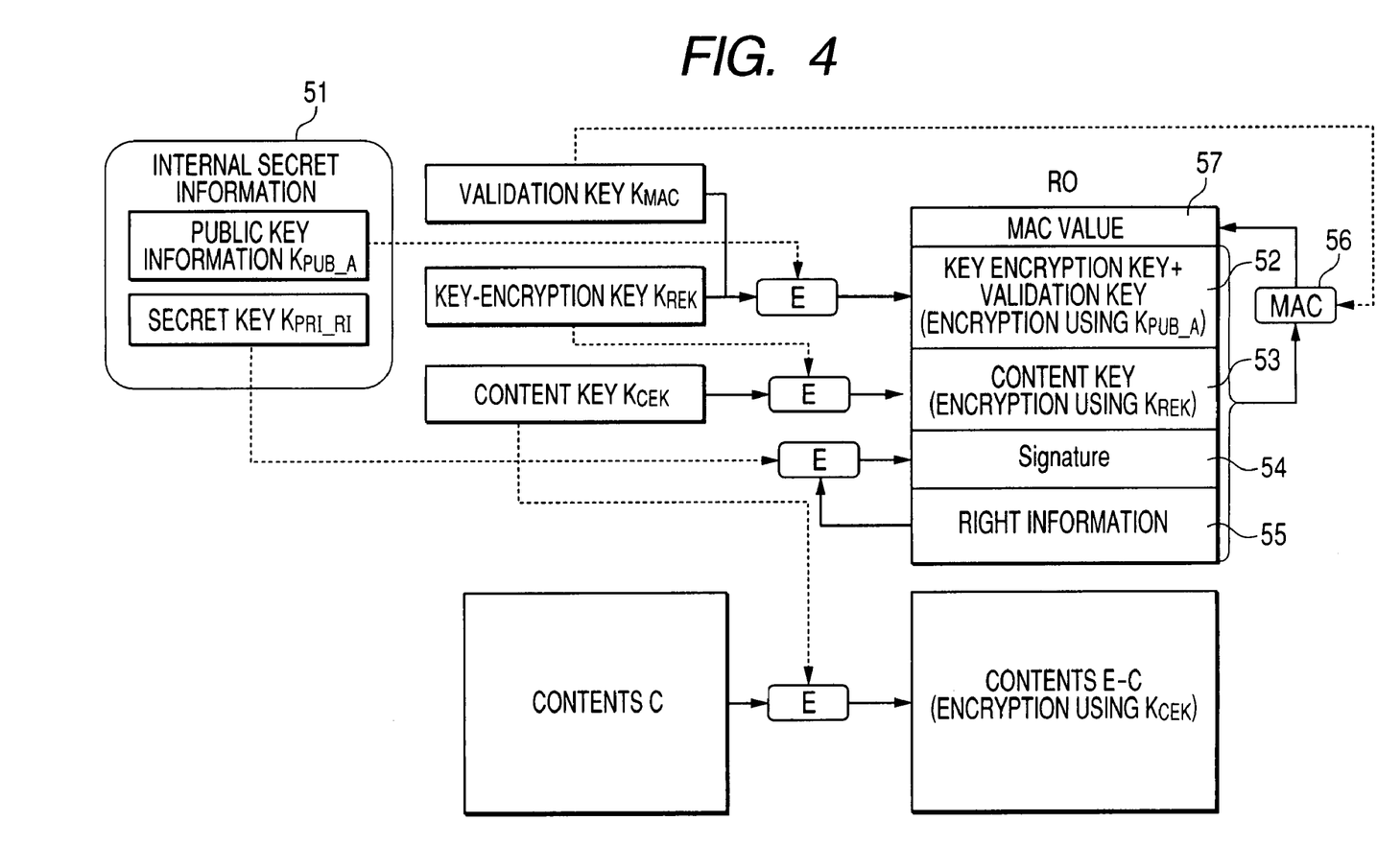
FIG. 4 is an exemplary view showing a process of generating a right object and encrypted contents generated in the content sharing system according to the embodiment.

FIG. 4 shows a process of generating the right object RO and the encrypted contents E-C. As shown in FIG. 4, the rights issuing server 20 stores internal secret information 51 having public key information $K_{PUB\_A}$ of the first device 11 and a secret key $K_{PRI\_RI}$ of the rights issuing server 20. Further, when issuing the right object RO, the rights issuing server 20 generates a validation key $K_{MAC}$, a key-encryption key $K_{REK}$, and a content key $K_{CEK}$ and performs the encryption using an encryption program E.

The content key $K_{CEK}$ is applied to the encryption program E so as to acquire the contents E-C encrypted by encrypting contents C. The validation key $K_{MAC}$ and the key-encryption key $K_{REK}$ are encrypted using the public key information $K_{PUB\_A}$ so as to generate the right object RO, thereby acquiring an encryption sentence 52 which consists of the validation key $K_{MAC}$ and the key-encryption key $K_{REK}$. When the content key $K_{CEK}$ is encrypted using the key-encryption key $K_{REK}$, an encryption sentence 53 of the content key is acquired. A signature 54 that is a signature of a right holder obtained by encrypting the right information 55 using the secret key $K_{PRI\_RI}$. The signature 54 may be omitted. Further, a MAC value 57 may be acquired by applying the validation key $K_{MAC}$ to a hash function 56 with respect to the right information 55, the signature 54, the encryption sentence 53 of the content key, and the encryption sentence 52 which includes the validation key $K_{MAC}$ and the key-encryption key $K_{REK}$. The above-described MAC value 57, the right information 55, the signature 54, the encryption sentence 53 of the content key, and the encryption sentence 52 which includes the validation key $K_{MAC}$ and the key-encryption key $K_{REK}$ are issued as the right object RO.

Figure 5:
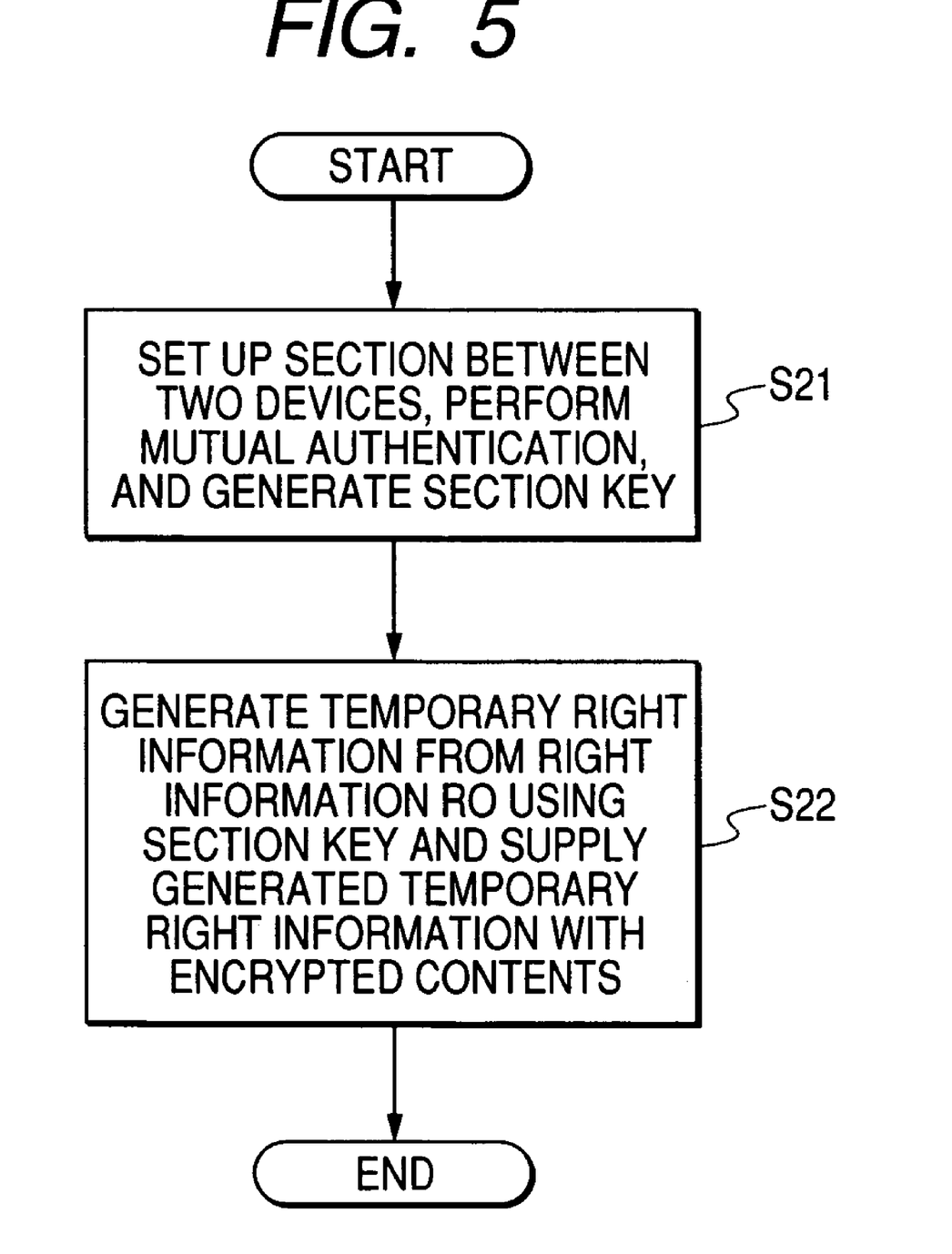
FIG. 5 is an exemplary flow chart showing a process of acquiring a temporary right object of the content sharing system according to the embodiment.

As shown in a flow chart of FIG. 5, the first and second devices 11 and 12 execute mutual authentication process by setting up a section so as to acquire a session key $K_S$ (step S21). The first device 11 generates the temporary right object $RO_S$ from the right object RO using the session key $K_S$ and supplies the generated temporary right object $RO_S$ with the encrypted contents E-C to the second device 12 (step S22). The contents E-C may be supplied to the second device 12 by allowing the first device 11 to copy the encrypted contents E-C and store the copied encrypted contents E-C in the second device 12 as a first method or allowing the first device 11 to supply the encrypted contents E-C to the second device 12 in a streaming manner as a second method. In the case of using the second method, it is possible to share only a part of the contents with the second device 12 by limiting a range of the streaming.

Figure 6:
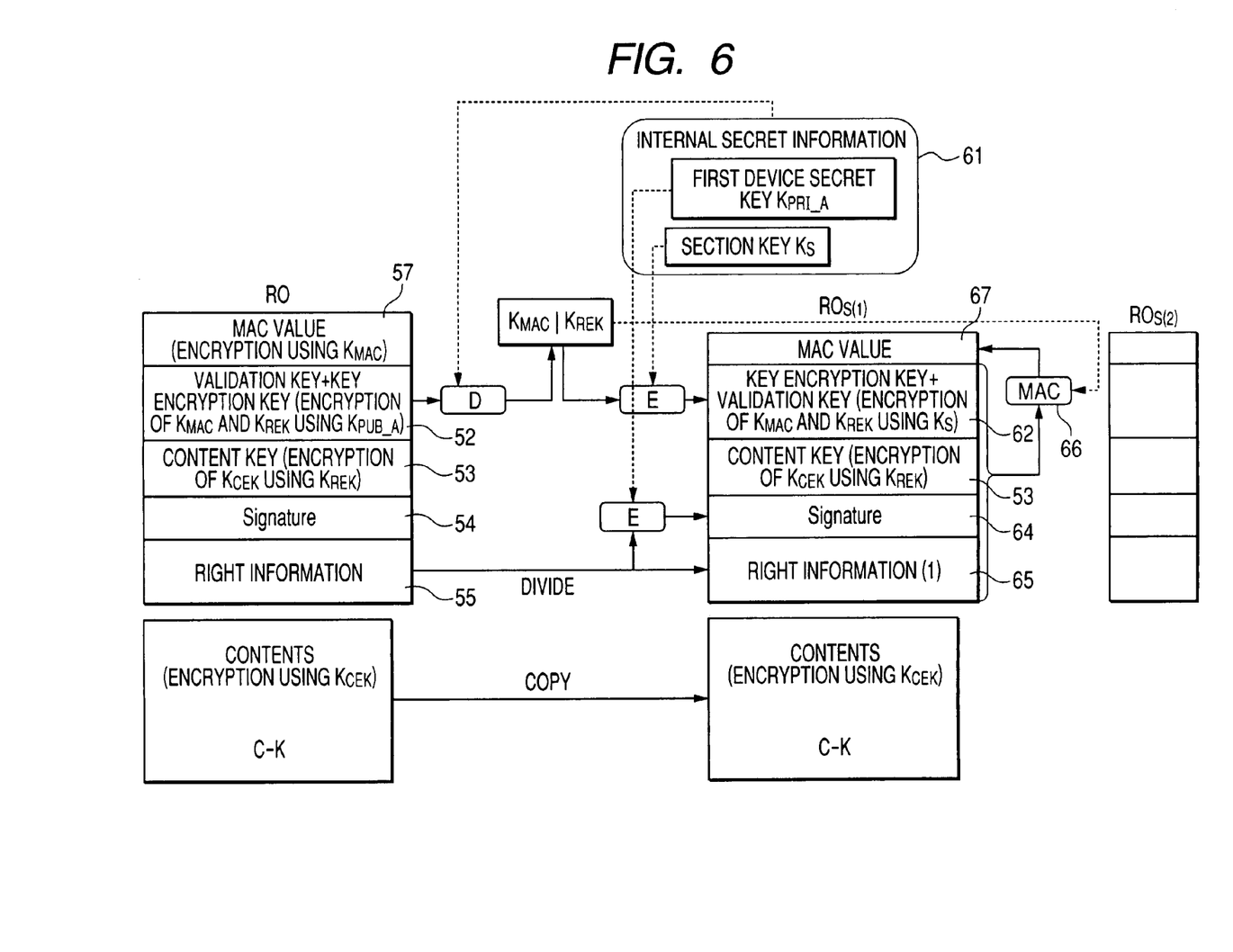
FIG. 6 is an exemplary view showing a process of generating a temporary right object in the content sharing system according to the embodiment.

FIG. 6 shows a process of generating the temporary right object $RO_S$. As shown in the left portion of FIG. 6, the first device 11 has the encrypted contents E-C and holds right object RO having the MAC value 57, the right information 55, the signature 54, the encryption sentence 53 of the content key, and the encryption sentence 52 which includes the validation key $K_{MAC}$ and the key-encryption key $K_{REK}$. Further, the first device 11 has the internal secret information 61 including a secret key $K_{PRI\_A}$ and the session key $K_S$ of the first device 11.

Thereafter, the encrypted contents E-C is sent. A part of the right object RO is encrypted again to generate the temporary right object $RO_S$. The encryption sentence 52 which consists of the validation key and the key-encryption key is decoded using the secret key $K_{PRI\_A}$ of the first device 11 so as to acquire the validation key $K_{MAC}$ and the key-encryption key $K_{REK}$. The validation key $K_{MAC}$ and the key-encryption key $K_{REK}$ are encrypted using the session key $K_S$ so as to acquire an encryption sentence 62 which consists of the key-encryption key and the validation key. The encryption sentence 53 of the content key is set without change. The right information 55 may be assigned without being divided or assigned by being divided. In FIG. 6, divided right information (1) is assigned. The divided right information (1) 65 is controlled to be generated once or have a play time for one minute from the time of starting the play. With respect to the right information (1), the signature 64 which indicates the signature of the first device 11 is acquired using the secret key $K_{PRI\_A}$. As described above, the signature 64 may be omitted.

A MAC value 67 may be acquired by applying the validation key $K_{MAC}$ to a hash function 66 with respect to the right information (1) 65, the signature 64, the encryption sentence 63 of the content key, and the encryption sentence 62 which includes the validation key and the key-encryption key. The above-described MAC value 67, the right information (1) 65, the signature 64, the encryption sentence 63 of the content key, and the encryption sentence 62 which includes the validation key and the key-encryption key are issued as the temporary right object $RO_S$ (1). A temporary right object $RO_S$ (2) indicates, for example, a temporary right object issued next to the temporary right object $RO_S$ (1).

In the second device 12 which receives the encrypted contents E-C, the temporary right object $RO_S$ (1), and the temporary right object $RO_S$ (2), and so on, an encryption sentence 62 which consists of the key-encryption key and the validation key are decoded using the session key $K_S$, thereby acquiring the key encryption key $K_{REK}$ and an encryption sentence 53 is decoded using the key encryption key $K_{REK}$, thereby acquiring the content key $K_{CEK}$. The contents E-C encrypted by the content key $K_{CEK}$ is decoded, played within a range permitted by the right information, and output from the output unit 33-2.

As described above, the contents of the temporary right object $RO_S$ (1), the temporary right object $RO_S$ (2), and the like can be temporally shared by controlling a play function thereof. The first device 11 may communicate with the second device 12 when generating the session key $K_S$ or receiving the contents and the temporary right object $RO_S$. Even when it is difficult that the first device 11 communicates with the second device 12, the contents can be temporally shared.

In the above description, it is assumed that the server that issues the right object RO is the same as the server that issues the encrypted contents E-C. However, the server may be divided into a server (right issuing server) that issues the right object RO and a server (content server) that issues the encrypted contents E-C.

Further, the contents according to the embodiment of the present invention may be not contents issued by a server (or content server). For example, the contents may be generated by another device. That is, it is not important where from the contents is issued but that the contents are permitted to be shared between devices.

Figure 7:
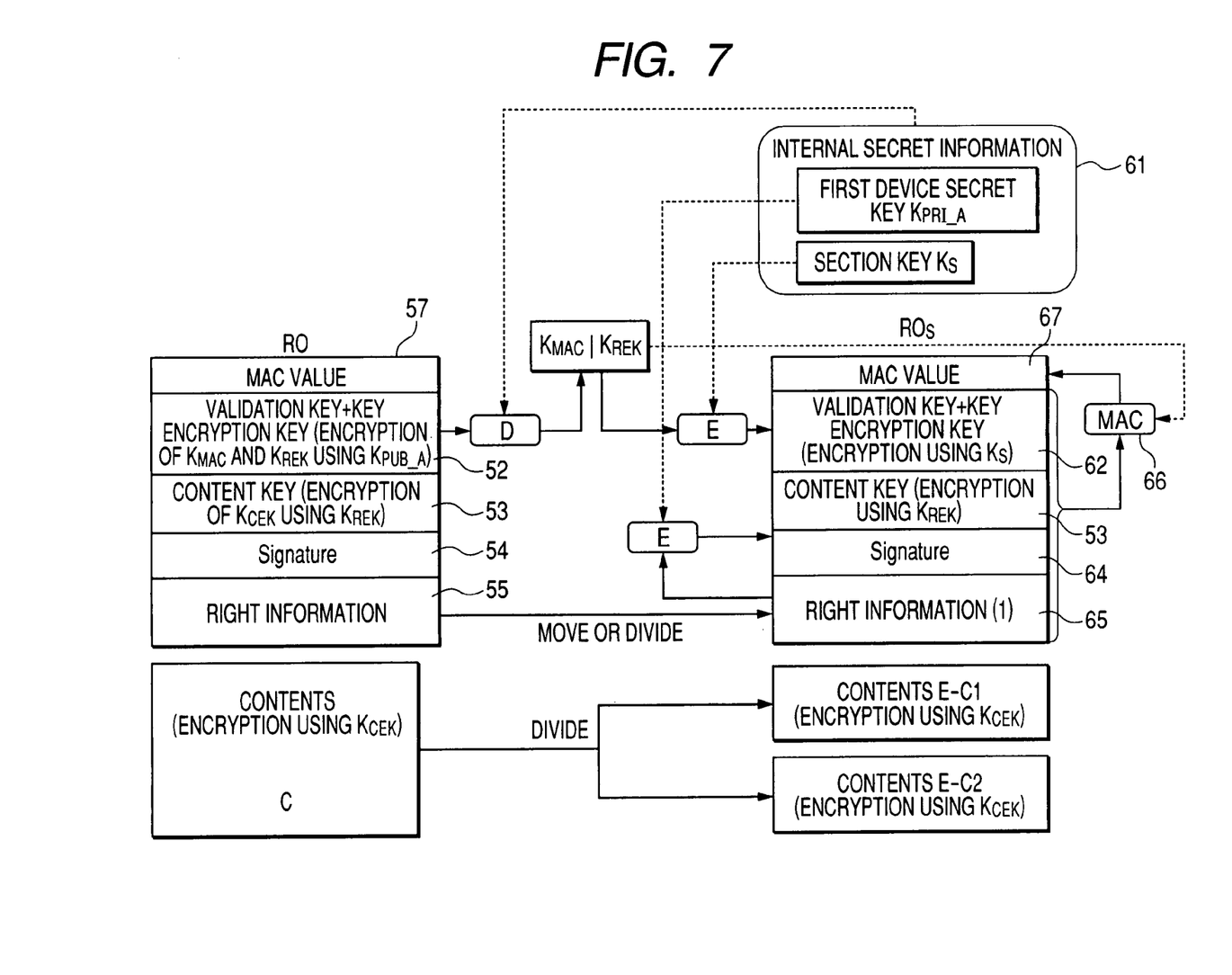
FIG. 7 is an exemplary view showing a process of generating a temporary right object in the content sharing system according to a modified embodiment of the invention.

FIG. 7 shows a process of generating a temporary right object $RO_S$ according to a modified embodiment of the invention. In this configuration, the encrypted contents E-C is divided into contents E-C1, E-C2, . . . and then is sent. A part of the right object RO is encrypted again to generate a temporary right object $RO_S$. This method is the same as the method shown in FIG. 6. The right information 55 may be divided and then assigned or be assigned without being dividing and then transmitted (moved).

In the modification of the invention, since the contents E-C is divided into contents E-C1, E-C2, . . . and then is sent, if the divided parts are not received, it is difficult to play the contents even though there are lots of temporary objects $RO_S$. Therefore, it is possible to temporally share the contents. Further, the second device 12 is decoded as the example described in FIG. 6.

In the above-described embodiment, the content key 53 is not changed. However, the content key 53 may be changed whenever the transmission is performed. In the modified embodiment, the changed content key is encrypted using the key-encryption key $K_{REK}$ and allocated. When the changed content key is transmitted, the right for play is provided such that the corresponding contents can be temporally shared. In the modified embodiment of the invention, it is desired that the first device 11 can communicate with the second device 12 when generating a session key $K_S$ or receiving the contents and temporary right object $RO_S$. However, even though the first device 11 can not communicate with the second device 12, it is possible to temporally share contents.

According to the above-embodiments, the mutual authentication is performed between the first device and the second device, a session key is generated, a temporary right object is generated from the right object using the session key in the first device and the generated temporary right object is supplied to the second device, and the temporary right object is received and the right object content acquired from the first device is played using the received temporary right object in the second device. Therefore, the second device may temporally use contents without registration to a right issuing server. Accordingly, even when the first device and the second device are moved to a region where the first device and the second device can not be registered in the right issuing server, it is possible to supply contents from the first device without being connected to the right issuing server.

What is claimed is:

1. A content sharing system comprising:
    a first device comprising:
        (i) a receiver which receives, from a server, encrypted content which is encrypted by using a content key and a right object, associated with the encrypted content, wherein the right object includes at least an encrypted content key generated by encrypting the content key with a key encryption key, an encrypted key encryption key generated by encrypting the key encryption key with a public key, and first right information which defines a range of playing the encrypted content, enabling the first device to play the encrypted content;
        (ii) a storage unit which stores the encrypted content and the right object received from the server;
        (iii) a session key generating unit which generates a session key by executing a mutual authentication with a second device;
        (iv) an encryption/decryption unit which decrypts the encrypted key encryption key with a secret key of the first device and re-encrypts the decoded key encryption key with the session key; and
        (v) a transmitter which transmits the encrypted content encrypted with the content key, the encrypted content key encrypted with the key encryption key, the encrypted key encryption key encrypted with the session key, and second right information, which is a part of the first right information, to a second device; and
    wherein the second device comprises:
        (i) a receiver which receives the encrypted content encrypted with the content key, the encrypted content key encrypted with the key encryption key, the encrypted key encryption key encrypted with the session key, and the second right information which is a part of the first right information from the first device; and
        (ii) a storage unit which stores the encrypted content encrypted with the content key, the encrypted content key encrypted with the key encryption key, the encrypted key encryption key encrypted with the session key, and the second right information which is a part of the first right information.

2. The system according to claim 1, wherein the second right information includes the part of the first right information by dividing from the first right information.

3. A content sharing method comprising:
    receiving an encrypted content encrypted using a content key and a right object, which is associated with the encrypted content, wherein the right object includes at least an encrypted content key generated by encrypting the content key with a key encryption key, an encrypted key encryption key generated by encrypting the key encryption key with a public key, and first right information which defines a range of playing the encrypted content;
    generating a session key by executing a mutual authentication;
    decrypting the encrypted key encryption key with a secret key;
    re-encrypting the decoded key encryption key with the session key; and
    transmitting the encrypted content encrypted with the content key, the encrypted content key encrypted with the key encryption key, the encrypted key encryption key encrypted with the session key, and second right information which is part of the first right information.

4. The content sharing method according to claim 3, wherein the second right information includes the part of the first right information by dividing from the first right information.

5. A mobile terminal comprising:
a receiver which receives, from a server, an encrypted content encrypted by using a content key and a right object, which is associated with the encrypted content, the right object including at least an encrypted content key generated by encrypting the content key with a key encryption key, an encrypted key encryption key generated by encrypting the key encryption key with a public key, and first right information which defines a range of playing the encrypted content that the first device enables to play the encrypted content;
a storage unit which stores the encrypted content and the right object received from the server;
a session key generating unit which generates a session key by executing a mutual authentication with another mobile terminal;
an encryption/decryption unit which decrypts the encrypted key encryption key with a secret key of the first device and re-encrypts the decoded key encryption key with the session key; and
a transmitter which transmits the encrypted content encrypted with the content key, the encrypted content key encrypted with the key encryption key, the encrypted key encryption key encrypted with the session key, and second right information, which is a part of the first right information, to another mobile terminal.

6. The mobile terminal according to claim 5, wherein the second right information includes the part of the first right information by dividing from the first right information.

* * * * *